(12) United States Patent
Savin et al.

(10) Patent No.: US 6,330,578 B1
(45) Date of Patent: Dec. 11, 2001

(54) METHOD AND APPARATUS FOR DIGITALLY REPRESENTING A WAVEFORM

(75) Inventors: Cristian Emanuel Savin; Bradley John Morris, both of Ottawa (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/329,997

(22) Filed: Jun. 11, 1999

(51) Int. Cl.[7] ........................................... G06F 1/02
(52) U.S. Cl. ................................. 708/270; 708/276
(58) Field of Search ............................. 708/270–276, 708/440

(56) References Cited

U.S. PATENT DOCUMENTS

| | | | |
|---|---|---|---|
| 4,855,946 | 8/1989 | Ruben et al. | 364/721 |
| 5,142,487 | * 8/1992 | Graham, III | 708/276 |
| 5,175,514 | 12/1992 | Iinuma et al. | 332/103 |
| 5,369,378 | 11/1994 | Kosaka et al. | 332/104 |
| 6,005,419 | * 12/1999 | Rudish | 708/271 |
| 6,167,102 | * 12/2000 | Hellberg | 708/271 |

* cited by examiner

Primary Examiner—Tan V. Mai (57) ABSTRACT

A method and apparatus for digitally representing a waveform segment defined by discrete ordered pairs of abscissae and ordinates, the ordered pairs being divided into an odd set and an even set. The method includes the steps of: for each even abscissa, generating a difference code representing a difference between an even ordinate paired with the even abscissa and the even abscissa, whereby the even ordinate paired with the even abscissa is represented as the sum of the even abscissa and the corresponding difference code; and for each odd abscissa, generating a differential code representing a differential between an odd ordinate paired with the odd abscissa and an even ordinate corresponding to the odd abscissa, whereby the odd ordinate paired with the odd abscissa is represented as the sum of the corresponding even ordinate and the corresponding differential code.

22 Claims, 4 Drawing Sheets

METHOD AND APPARATUS FOR DIGITALLY REPRESENTING A WAVEFORM

BACKGROUND OF THE INVENTION

1. Field of the Invention

The present invention relates to a method and apparatus for digitally representing a waveform. More particularly, aspects of the invention are directed to digitally representing a waveform as phase-interleaved first and second sets of samples, the ordinates of adjacent samples differing differentially. The invention has particular application in numerically controlled oscillators.

2. Background

Numerically controlled oscillators (NCOs) are components in digital communication systems, including digital transceivers. Incorporated into a digital mixer, an NCO provides digitally controlled frequency synthesis and frequency tuning.

At its heart, an NCO includes a read only memory (ROM) lookup table that stores a waveform's peak values (ordinates) at discrete phase intervals (abscissa). When the lookup table is addressed in a predetermined sequence at a predetermined clock-rate, the lookup table outputs a sequence of peak values that discretely reconstruct the waveform at a predetermined frequency. Effectively, the lookup table maps waveform phase into amplitude at discrete intervals.

The precision of the waveform representation increases with finer phase resolution and finer amplitude quantization. However, precision comes at a cost. Finer phase resolution requires that the size of the lookup table, and hence the ROM, be increased to store more ordinates. Similarly, finer amplitude quantization requires that the size of the lookup table, and hence the ROM, be increased to store ordinates encoded with more bits.

An important design criterion is to minimize the size of the ROM lookup table, while maintaining adequate precision in representing a waveform.

SUMMARY OF THE INVENTION

Aspects of the present invention are directed toward providing a compact yet precise digital representation of a waveform, suitable for efficient storage in a lookup table, including a read only memory.

Embodiments of the present invention take advantage of a number of techniques to achieve compact waveform representation. Correlation between adjacent ordinates is exploited through differential pulse coding. A difference function is exploited to define each ordinate as the concatenation of a value stored in a lookup table cell plus the address of that lookup table cell. Waveform symmetry is exploited to avoid storing ordinates that can instead be calculated as symmetrical mappings of previously stored ordinates.

Thus, according to one embodiment of the invention, there is provided a method for digitally representing a waveform segment defined by discrete ordered pairs of abscissae and ordinates, the ordered pairs being divided into an odd set and an even set, the method including: for each even abscissa, generating a difference code representing a difference between an even ordinate paired with the even abscissa and the even abscissa, whereby the even ordinate paired with the even abscissa is represented as the sum of the even abscissa and the corresponding difference code; and for each odd abscissa, generating a differential code representing a differential between an odd ordinate paired with the odd abscissa and an even ordinate corresponding to the odd abscissa, whereby the odd ordinate paired with the odd abscissa is represented as the sum of the corresponding even ordinate and the corresponding differential code.

Desirably, the even ordinate corresponding to the odd abscissa is paired with an even abscissa that is proximate to, or less than and adjacent to, or even immediately preceding the odd abscissa.

Generating a difference code preferably includes: bit-shifting the even abscissa to generate a bit-shifted even abscissa; and generating a difference code representing a difference between an even ordinate paired with the even abscissa and the bit-shifted even abscissa.

Advantageously, the method might further include: storing each difference code in a respective even memory cell addressable by the respective even abscissa; and storing each differential code in a respective odd memory cell addressable by the respective odd abscissa. The method might still further include concatenating into a combined memory cell an odd memory cell addressable by an odd abscissa and an even memory cell addressable by an even abscissa, the odd abscissa corresponding to and the even abscissa being paired with the same even ordinate.

The method might extend to digitally representing a second waveform segment that is symmetrical to the waveform segment, the method including: symmetrically mapping discrete ordered pairs that define the waveform segment into the second waveform segment.

Desirably, the method includes: ordinally selecting each abscissa; for each even selected abscissa, generating an ordinate as the sum of the selected abscissa plus the corresponding difference code; and for each odd selected abscissa, generating an ordinate as the sum of the selected abscissa plus the corresponding ordinate plus the corresponding differential code.

According to another aspect of the invention, there is provided an apparatus for digitally representing a waveform segment defined by discrete ordered pairs of abscissae and ordinates, the ordered pairs being grouped into an odd set and an even set, including: an even signal generator for generating for each even abscissa a difference code representing a difference between an even ordinate paired with the even abscissa and the even abscissa, whereby the even ordinate paired with the even abscissa is represented as the sum of the even abscissa and the corresponding difference code; and an odd signal generator for generating for each odd abscissa a differential code representing a differential between an odd ordinate paired with the odd abscissa and an even ordinate corresponding to the odd abscissa, whereby the odd ordinate paired with the odd abscissa is represented as the sum of the corresponding even ordinate and the corresponding differential code.

According to another aspect of the invention, there is provided an apparatus for digitally representing a waveform segment defined by discrete ordered pairs of abscissae and ordinates, the ordered pairs being grouped into an odd set and an even set, comprising: a module for generating for each even abscissa a difference code representing a difference between an even ordinate paired with the even abscissa and the even abscissa, whereby the even ordinate paired with the even abscissa is represented as the sum of the even abscissa and the corresponding difference code; and a module for generating for each odd abscissa a differential code representing a differential between an odd ordinate paired with the odd abscissa and an even ordinate corresponding to the odd abscissa, whereby the odd ordinate paired with the odd abscissa is represented as the sum of the corresponding even ordinate and the corresponding differential code.

According to yet another embodiment of the invention, there is provided a storage medium for storing a digital representation of a waveform segment defined by discrete ordered pairs of abscissae and ordinates, the ordered pairs being grouped into an odd set and an even set, comprising: for each even abscissa, a difference code representing a difference between an even ordinate paired with the even abscissa and the even abscissa, whereby the even ordinate paired with the even abscissa is represented as the sum of the even abscissa and the corresponding difference code; and for each odd abscissa, a differential code representing a differential between an odd ordinate paired with the odd abscissa and an even ordinate corresponding to the odd abscissa, whereby the odd ordinate paired with the odd abscissa is represented as the sum of the corresponding even ordinate and the corresponding differential code.

According to still another embodiment of the invention, there is provided a signal digitally representing a waveform segment defined by discrete ordered pairs of abscissae and ordinates, the ordered pairs being grouped into an odd set and an even set, the signal including: a plurality of pairs of even ordinate paired with even abscissa, wherein each even ordinate paired with an even abscissa is represented as a sum of the even abscissa and a corresponding difference code, the corresponding difference code representing a difference between the even ordinate paired with the even abscissa and the even abscissa; and a plurality of pairs of odd ordinate paired with odd abscissa, wherein each odd ordinate paired with an odd abscissa is represented as a sum of an even ordinate corresponding to the odd abscissa and a corresponding differential code, the corresponding differential code representing a differential between the odd ordinate paired with the odd abscissa and the corresponding even ordinate. Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
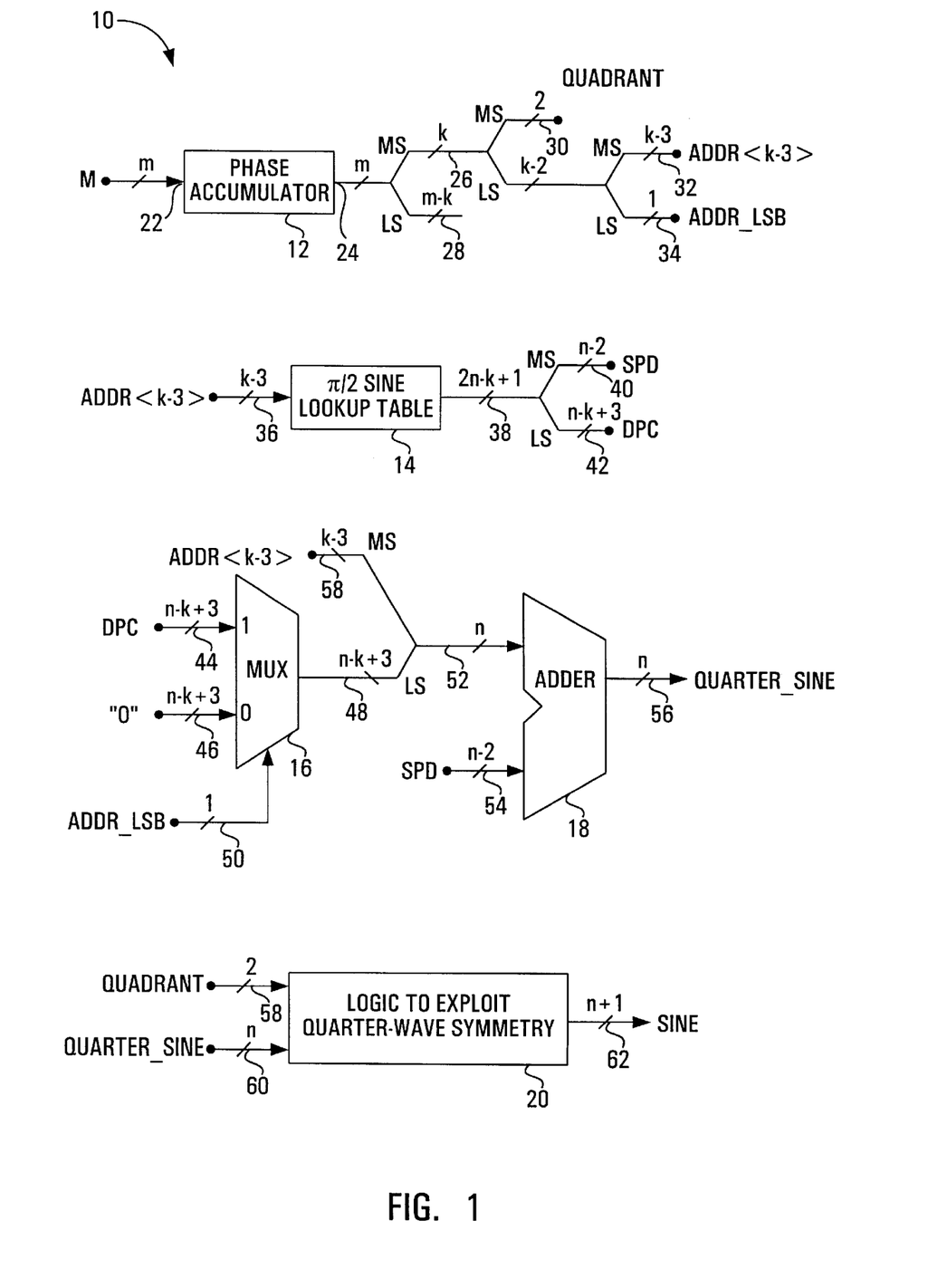
FIG. 1 is a block diagram of a numerically controlled oscillator, according to a first embodiment of the invention.

FIG. 1 is a block diagram of a numerically controlled oscillator (NCO) according to a first embodiment of the invention, generally illustrated at 10. The NCO 10 generates a digital representation of a waveform, recreated from a finite number of discrete samples.

The NCO 10 in this embodiment resolves the waveform sampling interval to k-bits that denote specific phase values (the abscissa). The NCO 10 quantizes the waveform amplitude (the ordinate) to n-bits plus a sign bit. In this embodiment, the number of amplitude bits n is greater than or equal to the number of phase bits k and the waveform being represented is a sinewave.

The NCO 10 includes a phase accumulator 12, a quarter symmetry read only memory (ROM) lookup table 14, a multiplexer 16, an adder 18, and a logic circuit 20, all interconnected as described in the paragraphs below.

The phase accumulator 12 is conventional and has an m-bit input bus 22 and an m-bit output bus 24. At each clock cycle, the value present at the phase accumulator input bus 22 is added to the value previously accumulated in the phase accumulator 12, and which is provided at its output bus 24. In this embodiment, the phase accumulator 12 is a modulo-$2^m$ accumulator incremented in steps of M.

The m-bit output bus 24 of the phase accumulator 12 is divided into its k most significant bits 26 and its m−k least significant bits 28. The m−k least significant bits 28 are not used in this embodiment. The k most significant bits 26 are subdivided into the two most significant bits 30, the k−3 next most significant bits 32 and the one least significant bit 34.

The two most significant bits 30 are mnemonically identified as a QUADRANT signal for designating in which of four quadrants a quarter waveform ordinate is being reconstructed. The k−3 next most significant bits 32 are mnemonically identified as an ADDR<k−3> signal for addressing a current cell in the lookup table 14. The least significant one bit 34 is mnemonically identified as an ADDR_LSB signal for identifying whether the currently addressed cell in the lookup table 14 corresponds to an even or odd coordinate pair.

In this embodiment, an even pair means a pair that is a member of a first set of pairs and an odd pair means a pair that is a member of a second set of pairs. Each pair includes an abscissa and an ordinate. Preferably, an even pair is characterized by having an even ordinal abscissa and an odd pair is characterized by having an odd ordinal abscissa. Thus, the abscissa of the even first set interleave the abscissa of the odd second set.

The lookup table 14 has a k−3-bit input bus 36 and a 2n−k+1-bit output bus 38. The input bus 36 receives the ADDR<k−3> signal from the phase accumulator 12 for addressing cells in the lookup table 14. The output bus 38 produces a signal corresponding to a value stored in the lookup table cell currently addressed. The output bus 38 is divided into its n−2 most significant bits 40 and its n−k+3 least significant bits 42.

The n−2 most significant bits 40 are mnemonically identified as an SPD signal, which is a difference signal, and in particular a sine-phase difference signal. The SPD signal, as represented by codes stored in the currently addressed cell in the lookup table 14, corresponds to the difference between a waveform even ordinate to be represented and the value of the ADDR<k−3> signal addressing the current cell in the lookup table 14 left-shifted n−k+2 bits.

Thus, an even waveform ordinate is equal to the sum of the left-shifted ADDR<k−3> signal addressing the current cell in the lookup table 14 and the SPD signal as represented by codes stored in the currently addressed cell in the lookup table 14, more particularly the n−2 most significant bits 40 of the output bus 38.

The n−k+3 least significant bits 42 of the output bus 38 are mnemonically identified as a DPC signal representing a differential pulse code. The DPC signal, as represented by codes stored in the currently addressed cell in the lookup table 14, corresponds to the difference between a waveform odd ordinate to be represented and the sum of the left-shifted ADDR<k−3> signal addressing the current cell in the lookup table 14 plus the SPD signal as represented by codes stored in the currently addressed cell in the lookup table 14. In other words, a DPC signal represents the difference between an odd ordinate and the immediately preceding even ordinate.

Thus, an odd waveform ordinate is equal to the sum of the left-shifted ADDR<k−3> signal addressing the current cell in the lookup table 14, plus the SPD signal as represented by codes stored in the currently addressed cell in the lookup table 14, more particularly the n−2 most significant bits 40 of the output bus 38, plus the DPC signal as represented by codes stored in the currently addressed cell in the lookup table 14, more particularly the n−k+3 least significant bits 42 of the output bus 38.

This embodiment of the NCO 10 exploits the quarter symmetry of the sinewave being reconstructed. To this end, it will be appreciated that the ROM lookup table 14 needs only k/4 cells to represent ordinate values within one quadrant of the sinewave, in this embodiment the quadrant between 0 and pi/2. Ordinates in the other three quadrants are merely vertical and/or horizontal reflections of the first quadrant ordinates.

The multiplexer 16 has an n−k+3-bit first input bus 44, an n−k+3-bit second input bus 46, an n−k+3-bit output bus 48 and a 1-bit control terminal 50. The first input bus 44 is connected to receive the DPC signal from the lookup table 14. The second input bus 46 is connected to permanently receive a digital zero signal. The 1-bit control terminal 50 is connected to receive the ADDR_LSB signal from the phase accumulator 12.

Thus, under the control of the ADDR_LSB signal, the output bus 48 receives either the DPC signal or the zero signal. When the ADDR_LSB signal is active, an odd pair is being addressed and thus the output bus 48 receives the DPC signal. Alternatively, when the ADDR_LSB signal is inactive, an even pair is being addressed and thus the output bus 48 receives the zero signal.

The adder 18 has an n-bit first input bus 52, an n−2-bit second input bus 54, and an n-bit output bus 56. The k−3 most significant bits 58 of the first input bus 52 are connected to receive the ADDR<k−3> signal from the phase accumulator 12, inherently left-shifting the ADDR<k−3> signal. The n−k+3 least significant bits of the first input bus 52 are connected to the output bus 48 of the multiplexer 16 to receive either the DPC signal from the lookup table 14 or the zero signal. The second input bus 54 is connected to receive from the lookup table 14 the SPD signal. Summing the signals received at the first and second input buses 52, 54, the adder produces at its output bus 56 a QUARTER_SINE signal representing a quarter sinewave.

The logic circuit 20 includes a 2-bit first input bus 58, an n-bit second input bus 60, and an n+1-bit output bus 62. The first input bus 58 is connected to receive from the phase accumulator 12 the QUADRANT signal. The second input bus 60 is connected to the adder 18 to receive the QUARTER_SINE signal. The logic circuit 20 is conventional and maps the samples received as the QUARTER_SINE signal into the appropriate quadrant of symmetry dictated by the QUADRANT signal to generate a full wave SINE signal at the output bus 62.

Figure 2:
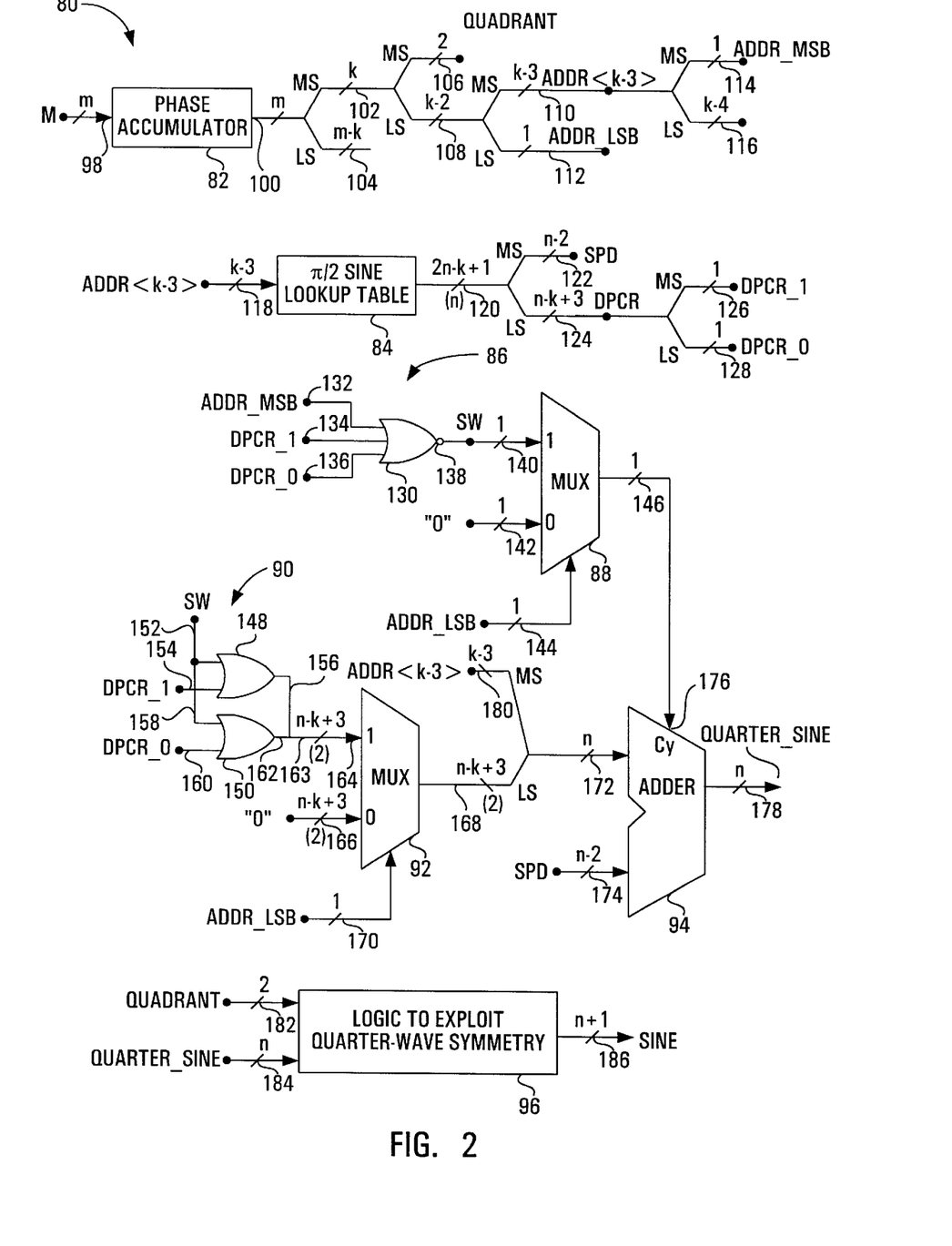
FIG. 2 is a block diagram of a numerically controlled oscillator according to a second embodiment of the invention.

FIG. 2 is a block diagram of a numerically controlled oscillator (NCO) according to a second embodiment of the invention, generally illustrated at 80. The NCO 80 generates a digital representation of a waveform, recreated from a finite number of discrete samples.

The NCO 80 in this embodiment resolves the waveform sampling interval to k-bits that denote specific phase values (the abscissa). The NCO 80 quantizes the waveform amplitude (the ordinate) to n-bits plus a sign bit. In this embodiment, the number of amplitude bits n is equal to the number of phase bits k less 1 and the waveform being represented is a sinewave.

The NCO 80 includes a phase accumulator 82, a quarter symmetry read only memory (ROM) lookup table 84, a first logic circuit 86, a first multiplexer 88, a second logic circuit 90, a second multiplexer 92, an adder 94, and a third logic circuit 96, all interconnected as described in the paragraphs below.

The phase accumulator 82 is conventional, and has an m-bit input bus 98 and an m-bit output bus 100. At each clock cycle, the value present at the phase accumulator input bus 98, is added to the value previously accumulated in the phase accumulator 82, and which is provided at its output bus 100. In this embodiment, the phase accumulator 82 is a modulo-$2^m$ accumulator incremented in steps of M.

The n-bit output bus 100 of the phase accumulator 82 is divided into its k most significant bits 102 and its m−k least significant bits 104. The m−k least significant bits 104 are not used in this embodiment. The k most significant bits 102 are subdivided into the two most significant bits 106 and the k−2 least significant bits 108. The k−2 least significant bits 108 are further subdivided into the k−3 most significant bits 110 and the one least significant bit 112. Finally, the k−3 most significant bits 110 are still further subdivided into the one most significant bit 114 and the k−4 least significant bits 116. The k−4 least significant bits 116 are not used in this embodiment.

The two most significant bits 106 are mnemonically identified as a QUADRANT signal for designating in which of four quadrants a quarter waveform ordinate is being reconstructed. The k−3 most significant bits 110 are mnemonically identified as an ADDR<k−3> signal for addressing the current cell in the lookup table 84. The most significant bit 114 is mnemonically identified as an ADDR_MSB signal and affects differential pulse coding as will be described below. The least significant bit 112 is mnemonically identified as an ADDR_LSB signal for identifying whether the currently addressed cell in the lookup table 84 corresponds to an even or odd coordinate pair.

In this embodiment, an even pair means a pair that is a member of a first set of pairs and an odd pair means a pair that is a member of a second set of pairs. Each pair includes an abscissa and an ordinate. Preferably, an even pair is characterized by having an even ordinal abscissa and an odd pair is characterized by having an odd ordinal abscissa. Thus, the abscissa of the even first set interleave the abscissa of the odd second set.

The lookup table 84 has a k−3-bit input bus 118 and a 2n−k+1-bit (which for n=k−1 reduces to n-bit) output bus 120. The input bus 118 receives the ADDR<k−3> signal from the phase accumulator 82 for addressing cells in the lookup table 84. The output buss 120 produces a signal corresponding to a value stored in the lookup table cell currently addressed. The output bus 120 is divided into its n−2 most significant bits 122 and its n−k+3 (which for n=k−1 reduces to 2) least significant bits 124. The n−k+3 least significant bits 124 are further subdivided into the one most significant bit 126 and the one least significant bit 128.

The n−2 most significant bits 122 are mnemonically identified as an SPD signal, which is a difference signal, and in particular a sine-phase difference signal. The SPD signal, as represented by codes stored in the currently addressed cell in the lookup table 84, corresponds to the difference between a waveform even ordinate to be represented and the value of the ADDR<k−3> signal addressing the current cell in the lookup table 84 left-shifted n−k+2 bits.

Thus, an even waveform ordinate is equal to the sum of the left-shifted ADDR<k−3> signal addressing the current cell in the lookup table 84 and the SPD signal as represented by codes stored in the currently addressed cell in the lookup table 84, more particulary the n−2 most significant bits 122 of the output bus 120.

The n−k+3 least significant bits 124 of the output bus 120 are mnemonically identified as a DPCR signal representing a re-encoded differential pulse code. This differential pulse code re-encoding exploits the fact that large differential pulses are predictably distributed in a sinewave. Therefore, the set of all possible differential pulses can be encoded using fewer bits than is necessary to represent the large pulses, by augmenting the encoding bits with logical signals that reflect the large pulse distribution. The DPCR signal, as represented by codes stored in the currently addressed cell in the lookup table 84, corresponds to the difference between a waveform odd ordinate to be represented and the sum of the left-shifted ADDR<k−3> signal addressing the current cell in the lookup table 84 plus the SPD signal as represented by codes stored in the currently address cell in the lookup table 84. In other words, a DPC signal represents the difference between an odd ordinate and the immediately preceding even ordinate.

The DPCR signal is further subdivided into a most significant bit 126 and a least significant bit 128, which are respectively mnemonically identified as a DPCR_1 signal and a DPCR_0 signal.

Thus, an odd waveform ordinate is equal to the sum of the left-shifted ADDR<k−3> signal addressing the current cell in the lookup table 84, plus the SPD signal as represented by codes stored in the currently addressed cell in the lookup table 84, more particulary the n−2 most significant bits 122 of the output bus 120, plus the DPCR signal as represented by codes stored in the currently addressed cell in the lookup table 84, more particularly the n−k+3 least significant bits 42 of the output bus 38.

This embodiment of the NCO 80 exploits the quarter symmetry of the sinewave being reconstructed. To this end, it will be appreciated that the ROM lookup table 84 needs only k/4 cells to represent ordinate values within one quadrant of the sinewave, in this embodiment the quadrant between 0 and pi/2. Ordinates in the other three quadrants are merely vertical and/or horizontal reflections of the first quadrant ordinates.

The first and second logic circuits 86, 90 and the first and second multiplexers 88, 92 are connected together to generate a logical signal reflecting the distribution of large differential pulses. This logical signal is mnemonically identified as a Cy signal, for designating an adder carry signal.

The first logic circuit 86 includes a NOR gate 130 having 1-bit first, second, and third input terminals 132, 134, 136 and one 1-bit output terminal 138. The first input terminal 132 is connected to receive the ADDR_MSB signal from the phase accumulator 82. The second input terminal 134 is connected to receive the DPCR_1 signal from the look-up table 84. The third input terminal 136 is connected to receive the DPCR_0 signal from the look-up table 84. The output terminal 138 of the NOR gate 130 is mnemonically identified as an SW signal for switching on and off a high-order bit in the differential pulse code.

The first multiplexer 88 has a 1-bit first input terminal 140, a 1-bit second input terminal 142, a 1-bit control terminal 144, and a 1-bit output terminal 146. The first input terminal 140 is connected to receive the SW signal from the first logic circuit 86. The second input terminal 142 is connected to permanently receive a digital zero signal. The control terminal 144 is connected to receive the ADDR_LSB signal from the phase accumulator 82. The output terminal 146 produces the Cy signal.

The second logic circuit 90 includes first and second OR gates 148, 150. The first OR gate 148 has a 1-bit first input terminal 152, a 1-bit second input terminal 154, and a 1-bit output terminal 156. The second OR gate 150 has a 1-bit first input terminal 158, a 1-bit second input terminal 160, and a 1-bit output terminal 162. The first OR gate 148 first input terminal 152 and the second OR gate 150 first input terminal 158 are coupled together to receive the SW signal from the first logic circuit 86. The first OR gate 148 second input terminal 154 is connected to receive the DPCR_1 signal from the look-up table 84. The second OR gate 150 second input terminal 160 is connected to receive the DPCR_0 signal from the look-up table 84. The first OR gate 148 output terminal 156 and the second OR gate 150 output terminal 162 together form a 2-bit output bus 163 (more generally, an n−k+3 bit output bus, which reduces to a 2-bit output bus for n=k−1), the first OR gate 148 output terminal 156 being the more significant.

The second multiplexer 92 has an n−k+3-bit (which reduces to 2-bit for n=k−1) first input bus 164, an n−k+3-bit (which reduces to 2-bit for n=k−1) second input bus 166, an n−k+3-bit (which reduces to 2-bit for n=k−1) output bus 168, and a 1-bit control terminal 170. The first input bus 164 is connected to the output bus 163 of the second logic circuit 90 to receive the output signal of the second logic circuit 90. The second input bus 166 is connected to permanently receive a digital zero signal. The 1-bit control terminal 170 is connected to receive the ADDR_LSB signal from the phase accumulator 82.

Thus, under the control of the ADDR_LSB signal, the output bus 168 receives either the re-encoded differential pulse code signal or the zero signal.

The adder 94 has an n-bit first input bus 172, an n−2-bit second input bus 174, a 1-bit carry terminal 176, and an n-bit output bus 178. The k−3 most significant bits 180 of the n-bit first input bus 172 are connected to receive the ADDR<k−3> signal from the phase accumulator 82, whereas the n−k+3 least significant bits of the first input bus 172 are connected to the output bus 168 of the second multiplexer 92 to receive either the re-encoded differential pulse code signal from the lookup table 84 or the zero signal. The second input bus 174 is connected to receive from the lookup table 84 the SPD signal. The carry terminal 176 is connected to the output terminal 146 of the first multiplexer 88. Summing the signals received at the first and second input buses 172,174, in view of the signal received from the carry terminal 176, the adder produces at its output bus 178 a QUARTER_SINE signal representing a quarter sinewave.

The third logic circuit 96 includes a 2-bit first input bus 182, an n-bit second input bus 184, and an n+1-bit output bus 186. The first input bus 182 is connected to receive from the phase accumulator 82 the QUADRANT signal. The n-bit second input bus 184 is connected to the adder 94 to receive the QUARTER_SINE signal. The third logic circuit 96 is conventional and maps the ordinates received as the QUARTER_SINE signal into the appropriate quadrant of symmetry directed by the QUADRANT signal to generate a full wave sine signal at the output bus 186.

Figure 3:
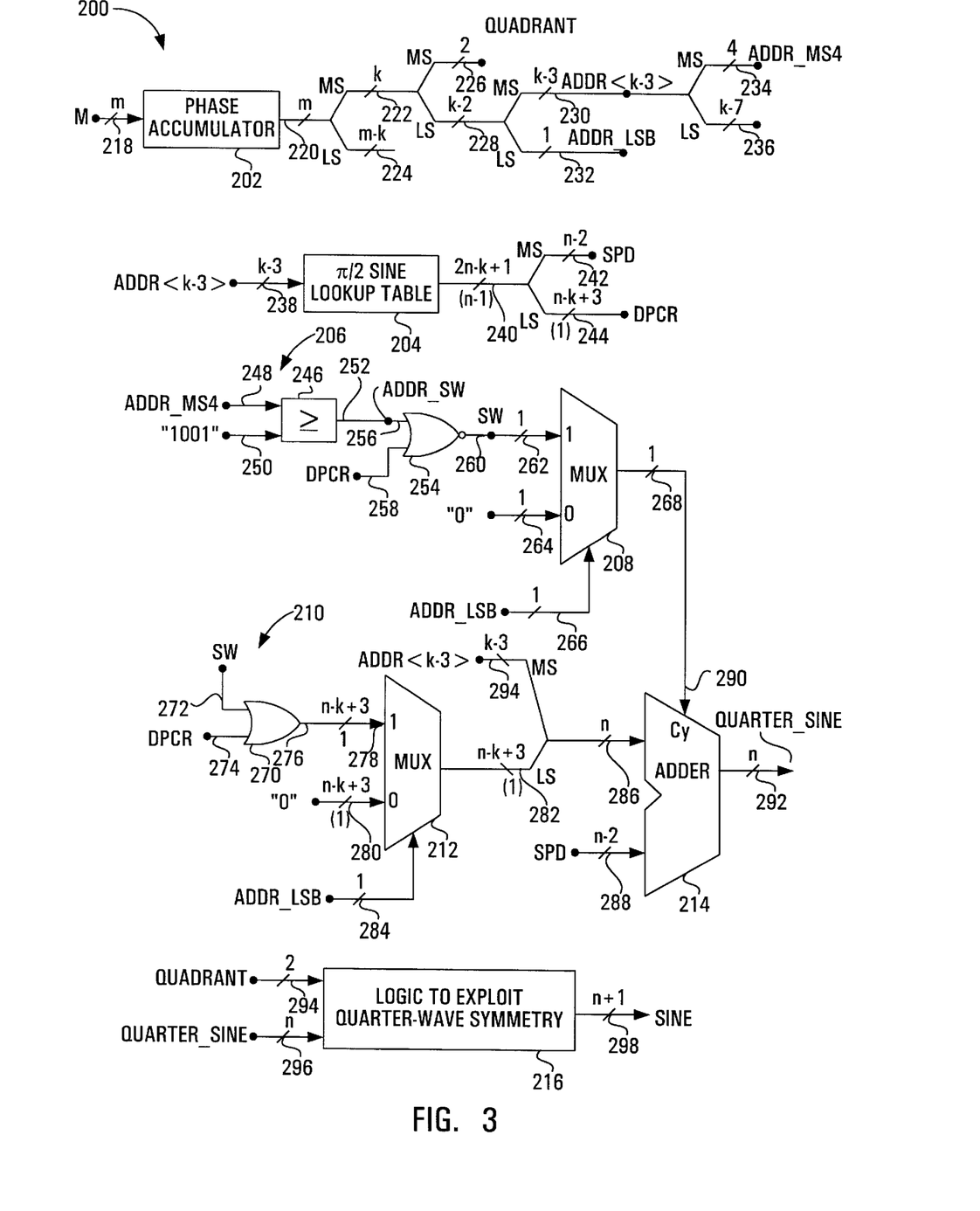
FIG. 3 is a block diagram of a numerically controlled oscillator according to a third embodiment of the invention.

FIG. 3 is a block diagram of a numerically controlled oscillator (NCO) according to a third embodiment of the invention, generally illustrated at 200. The NCO 200 generates a digital representation of a waveform, recreated from a finite number of discrete samples.

The NCO 200 in this embodiment resolves the waveform sampling interval to k-bits that denote specific phase values (the abscissa). The NCO 200 quantizes the waveform amplitude (the ordinate) to n-bits plus a sign bit. In this embodiment, the number of amplitude bits n is equal to the number of phase bits k less 2 and the waveform being represented is a sinewave.

The NCO 200 includes a phase accumulator 202, a quarter symmetry read only memory (ROM) lookup table 204, a first logic circuit 206, a first multiplexer 208, a second logic circuit 210, a second multiplexer 212, an adder 214, and a third logic circuit 216, all interconnected as described in the paragraphs below.

The phase accumulator 202 is conventional, and has an m-bit input bus 218 and an m-bit output bus 220. At each clock cycle, the value present at the phase accumulator input bus 218 is added to the value previously accumulated in the phase accumulator 202, and which is provided at its output bus 220. In this embodiment, the phase accumulator 202 is a modulo-$2^m$ accumulator incremented in steps of M.

The m-bit output bus 220 of the phase accumulator 202 is divided into its k most significant bits 222 and its m-k least significant bits 224. The m-k least significant bits 224 are not used in this embodiment. The k most significant bits 222 are subdivided into the two most significant bits 226 and the k-2 least significant bits 228. The k-2 least significant bits 228 are further subdivided into the k-3 most significant bits 230 and the one least significant bit 232. Finally, the k-3 most significant bits 230 are still further subdivided into the four most significant bits 234 and the k-7 least significant bits 236. The k-7 least significant bits 236 are not used in this embodiment.

The two most significant bits 226 are mnemonically identified as a QUADRANT signal for designating in which of four quadrants a quarter waveform ordinate is being reconstructed. The k-3 most significant bits 230 are mnemonically identified as an ADDR<k-3> signal for addressing the current cell in the lookup table 204. The four most significant bits 234 are mnemonically identified as an ADDR_MS4 signal and affect differential pulse coding as will be described below. The least significant bit 232 is mnemonically identified as an ADDR_LSB signal for identifying whether the currently addressed cell in the lookup table 204 corresponds to an even or odd coordinate pair.

In this embodiment, an even pair means a pair that is a member of a first set of pairs and an odd pair means a pair that is a member of a second set of pairs. Each pair includes an abscissa and an ordinate. Preferably, an even pair is characterized by having an even ordinal abscissa and an odd pair is characterized by having an odd ordinal abscissa. Thus, the abscissa of the even first set interleave the abscissa of the odd second set.

The lookup table 204 has a k-3-bit input bus 238 and a 2n-k+1-bit (which for n=k-2 reduces to n-1-bit) output bus 240. The input bus 238 receives the ADDR<k-3> signal from the phase accumulator 202 for addressing cells in the lookup table 204. The output bus 240 produces a signal corresponding to a value stored in the lookup table cell currently addressed. The output bus 240 is divided into its n-2 most significant bits 242 and its n-k+3 (which for n=k-2 reduces to 1) least significant bit 244.

The n-2 most significant bits 242 are mnemonically identified as an SPD signal, which is a difference signal, and in particular a sine-phase difference signal. The SPD signal, as represented by codes stored in the currently addressed cell in the lookup table 204, corresponds to the difference between a waveform even ordinate to be reproduced and the value of the ADDR<k-3> signal addressing the current cell in the lookup table 204 left-shifted n-k+2 bits.

Thus, an even waveform ordinate is equal to the sum of the left-shifted ADDR<k-3> signal addressing the current cell in the lookup table 204 and the SPD signal as represented by codes stored in the currently addressed cell in the lookup table 204, more particularly the n-2 most significant bits 242 of the output bus 240.

The n-k+3 least significant bit 244 of the output bus 240 is mnemonically identified as a DPCR signal representing a re-encoded differential pulse code. This differential pulse code re-encoding exploits the fact that large differential pulses are predictably distributed in a sinewave. Therefore, the set of all possible differential pulses can be encoded using fewer bits than is necessary to represent the large pulses, by augmenting the encoding bits with logical signals that reflect the large pulse distribution. The DPCR signal, as represented by codes stored in the currently addressed cell in the lookup table 204, corresponds to the difference between a waveform odd ordinate to be represented and the sum of the left-shifted ADDR<k-3> signal addressing the current cell in the lookup table 204 plus the SPD signal as represented by codes stored in the currently addressed cell in the lookup table 204. In other words, a DPC signal represents the difference between an odd ordinate and the immediately preceding even ordinate.

Thus, an odd waveform ordinate is equal to the sum of the left-shifted ADDR<k-3> signal addressing the current cell in the lookup table 204, plus the SPD signal as represented by codes stored in the currently addressed cell in the lookup table 204, more particulary the n-2 most significant bit 242 of the output bus 240, plus the DPCR signal as represented by codes stored in the currently addressed cell in the lookup table 204, more particularly the n-k+3 least significant bit 244 of the output bus 240.

This embodiment of the NCO 200 exploits the quarter symmetry of the sinewave being reconstructed. To this end, it will be appreciated that the ROM lookup table 204 needs only k/4 cells to represent ordinate values within one quadrant of the sinewave, in this embodiment the quadrant between 0 and pi/2. Ordinates in the other three quadrants are merely vertical and/or horizontal reflections of the first quadrant ordinates.

The first and second logic circuits 206, 210 and the first and second multiplexers 208, 212 are connected together to generate a logical signal reflecting the distribution of large differential pulses. This logical signal is mnemonically identified as a Cy signal, for designating an adder carry signal.

The first logic circuit 206 includes a comparator 246 having 4-bit first and second input buses 248, 250 and one 1-bit output terminal 252. The first input bus 248 is connected to receive the ADDR_MS4 signal from the phase accumulator 202. The second input bus 250 is connected to permanently receive a digital "1001" signal. The output terminal 252 is rendered active when the digital signal on the first bus 248 is equal to or greater than the digital signal on the second bus 250.

The first logic circuit 206 further includes a NOR gate 254 having a first input terminal 256, a second input terminal 258 and an output terminal 260. The first input terminal 254 is connected to receive the signal provided on the output terminal 252 of the comparator 246. The second input terminal 258 is connected to receive the DPCR signal from the lookup table 246. The output terminal 260 is mnemonically identified as providing an SW signal for switching on and off a high-order bit in the differential pulse code.

The first multiplexer 208 has a 1-bit first input terminal 262, a 1-bit second input terminal 264, a 1-bit control terminal 266, and a 1-bit output terminal 268. The first input terminal 262 is connected to receive the SW signal from the first logic circuit 206. The second input terminal 264 is connected to permanently receive a digital zero signal. The control terminal 266 is connected to receive the ADDR_LSB signal from the phase accumulator 202. The output terminal 268 produces the Cy signal.

The second logic circuit 210 includes an OR gate 270, having a first input terminal 272, a second input terminal 274, and a n−k+3-bit (which for n=k−2 reduces to 1-bit) output bus 276. The first input terminal 272 is connected to the SW signal from the first logic circuit 206. The second input terminal 274 is connected to receive the DPCR signal from the look-up table 204.

The second multiplexer 212 has an n−k+3-bit (which reduces to 1-bit for n=k−2) first input bus 278, an n−k+3-bit (which reduces to 1-bit for n=k−2) second input bus 280, an n−k+3-bit (which reduces to 1-bit for n=k−2) output bus 282, and a 1-bit control terminal 284. The first input bus 278 is connected to the output 276 of the of the OR gate 270. The second input bus 280 is connected to permanently receive a digital zero signal. The 1-bit control terminal 284 is connected to receive the ADDR_LSB signal from the phase accumulator 202.

Thus, under the control of the ADDR_LSB signal, the output bus 282 receives either the re-encoded differential pulse code signal or the zero signal.

The adder 214 has an n-bit first input bus 286, an n−2-bit second input bus 288, a 1-bit carry terminal 290, and an n-bit output bus 292. The k−3 most significant bits 294 of the n-bit first input bus 286 are connected to receive the ADDR<k−3> signal from the phase accumulator 202, whereas the n−k+3 least significant bit of the first input bus 286 is connected to the output bus 282 of the second multiplexer 212 to receive either the re-encoded differential pulse code signal from the lookup table 204 or the zero signal. The second input bus 288 is connected to receive from the lookup table 204 the SPD signal. The carry terminal 290 is connected to the output terminal 268 of the first multiplexer 208. Summing the signals received at the first and second input buses 286, 288, in view of the signal received from the carry terminal 290, the adder produces at its output bus 292 a QUARTER_SINE signal representing a quarter sinewave.

The third logic circuit 216 includes a 2-bit first input bus 294, an n-bit second input bus 296, and an n+1-bit output bus 298. The first input bus 294 is connected to receive from the phase accumulator 202 the QUADRANT signal. The n-bit second input bus 296 is connected to the adder 214 to receive the QUARTER_SINE signal. The third logic circuit 216 is conventional and maps the ordinates received as the QUARTER_SINE signal into the appropriate quadrant of symmetry directed by the QUADRANT signal to generate a full wave sine signal at the output bus 298.

Figure 4:
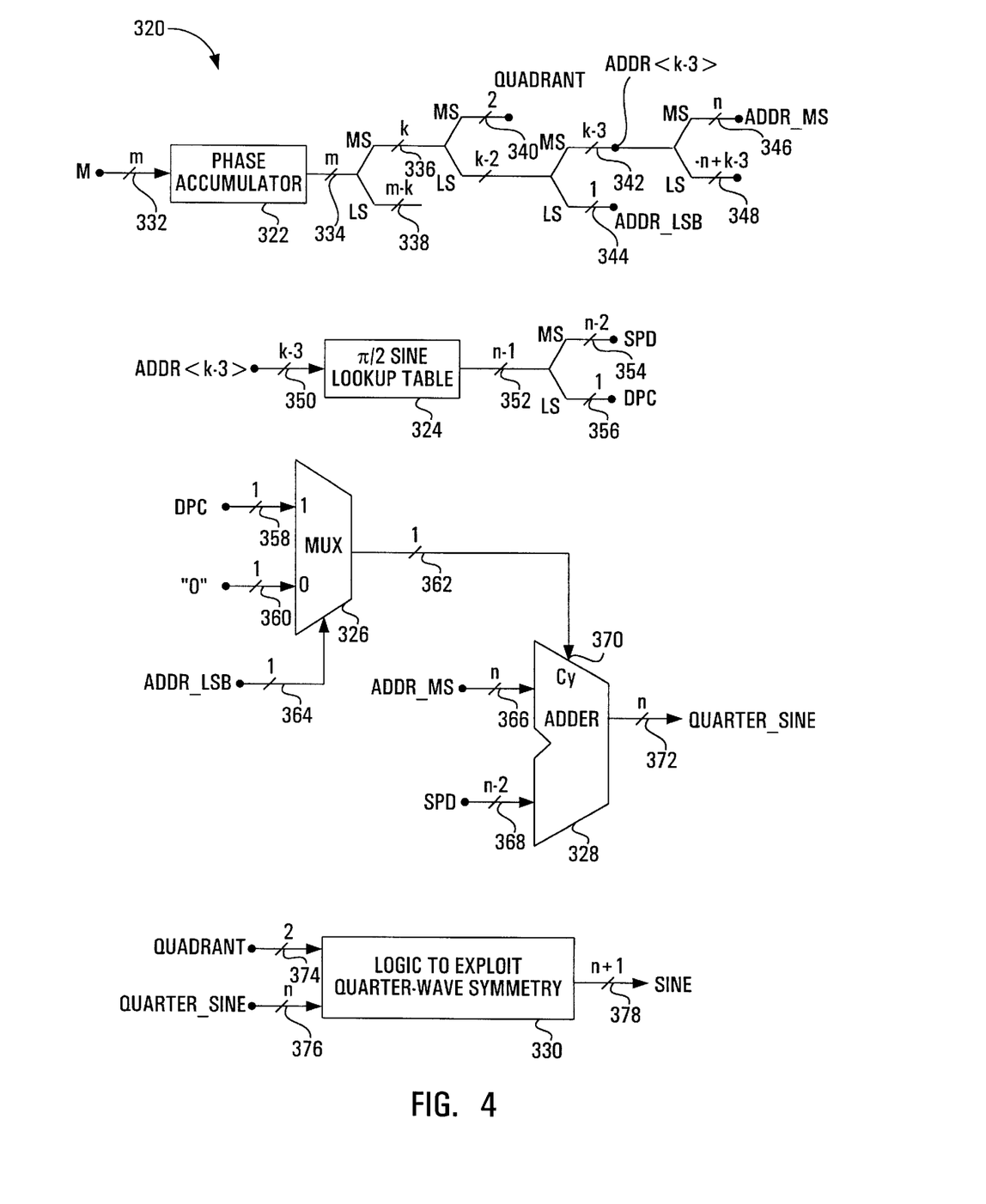
FIG. 4 is a block diagram of a numerically controlled oscillator according to a fourth embodiment of the invention.

FIG. 4 is a block diagram of a numerically controlled oscillator (NCO) according to a fourth embodiment of the invention, generally illustrated at 320. The NCO 320 generates a digital representation of a waveform, recreated from a finite number of discrete samples.

The NCO 320 in this embodiment resolves the waveform sampling interval to k-bits that denote specific phase values (the abscissa). The NCO 320 quantizes the waveform amplitude (the ordinate) to n-bits plus a sign bit. In this embodiment, the number of amplitude bits n is less than or equal to the number of phase bits k less 3 and the waveform being represented is a sinewave.

The NCO 320 includes a phase accumulator 322, a quarter symmetry read only memory (ROM) lookup table 324, a multiplexer 326, an adder 328, and a logic circuit 330, all interconnected as described in the paragraphs below.

The phase accumulator 322 is conventional and has an m-bit input bus 332 and an m-bit output bus 334. At each clock cycle, the value present at the phase accumulator input bus 332 is added to the value previously accumulated in the phase accumulator 322, and which is provided at its output bus 334. In this embodiment, the phase accumulator 322 is a modulo-$2^m$ accumulator incremented in steps of M.

The m-bit output bus 334 of the phase accumulator 322 is divided into its k most significant bits 336 and its m−k least significant bits 338. The m−k least significant bits 338 are not used in this embodiment. The k most significant bits 336 are subdivided into the two most significant bits 340, the k−3 next most significant bits 342 and the one least significant bit 344. Finally, the k−3 next most significant bits 342 are further sub-divided into n most significant bits 346 and the −n+k−3 least significant bits 348. The −n+k−3 least significant bits are not used in this embodiment.

The two most significant bits 340 are mnemonically identified as a QUADRANT signal for designating in which of four quadrants a quarter waveform ordinate is being reconstructed. The k−3 next most significant bits 342 are mnemonically identified as an ADDR<k−3> signal for addressing a current cell in the lookup table 324. The n most significant bits 346 are mnemonically identified as an ADDR_MS signal. The least significant one bit 344 is mnemonically identified as an ADDR_LSB signal for identifying whether the currently addressed cell in the lookup table 14 corresponds to an even or odd coordinate pair.

In this embodiment, an even pair means a pair that is a member of a first set of pairs and an odd pair means a pair that is a member of a second set of pairs. Each pair includes an abscissa and an ordinate. Preferably, an even pair is characterized by having an even ordinal abscissa and an odd pair is characterized by having an odd ordinal abscissa. Thus, the abscissa of the even first set interleave the abscissa of the odd second set.

The lookup table 324 has a k−3-bit input bus 350 and a n−1-bit output bus 352. The input bus 350 receives the ADDR<k−3> signal from the phase accumulator 322 for addressing cells in the lookup table 324. The output bus 352 produces a signal corresponding to a value stored in the lookup table cell currently addressed. The output bus 352 is divided into its n−2 most significant bits 354 and its one least significant bit 356.

The n−2 most significant bits 354 are mnemonically identified as an SPD signal, which is a difference signal, and in particular a sine-phase difference signal. The SPD signal, as represented by codes stored in the currently addressed cell in the lookup table 324, corresponds to the difference between a waveform even ordinate to be reproduced and the value of the ADDR<k−3> signal addressing the current cell in the lookup table 324 left-shifted n−k+2 bits.

Thus, an even waveform ordinate is equal to the sum of the left-shifted ADDR<k−3> signal addressing the current cell in the lookup table 324 and the SPD signal as represented by codes stored in the currently addressed cell in the lookup table 324, more particularly the n−2 most significant bits 354 of the output bus 352.

The 1 least significant bit 356 of the output bus 352 is mnemonically identified as a DPC signal representing a differential pulse code. The DPC signal, as represented by codes stored in the currently addressed cell in the lookup table 324, corresponds to the difference between a waveform odd ordinate to be represented and the sum of the left-shifted ADDR<k−3> signal addressing the current cell in the lookup table 324 plus the SPD signal as represented by codes stored in the currently addressed cell in the lookup table 324. In other words, a DPC signal represents the difference between an odd ordinate and the immediately preceding even ordinate.

Thus, an odd waveform ordinate is equal to the sum of the left-shifted ADDR<k−3> signal addressing the current cell in the lookup table 324, plus the SPD signal as represented by codes stored in the currently addressed cell in the lookup table 324, more particularly the n−2 most significant bits 354 of the output bus 352, plus the DPC signal as represented by codes stored in the currently addressed cell in the lookup table 324, more particularly the one least significant bit 356 of the output bus 352.

This embodiment of the NCO 320 exploits the quarter symmetry of the sinewave being reconstructed. To this end, it will be appreciated that the ROM-based lookup table 324 needs only k/4 cells to represent ordinate values within one quadrant of the sinewave, in this embodiment the quadrant between 0 and pi/2. Ordinates in the other three quadrants are merely vertical and/or horizontal reflections of the first quadrant ordinates.

The multiplexer 326 has a 1-bit first input terminal 358, a 1-bit second input terminal 360, a 1-bit output terminal 362, and a 1-bit control terminal 364. The first input terminal 358 is connected to receive the DPC signal from the lookup table 324. The second input terminal 360 is connected to permanently receive a digital zero signal. The 1-bit control terminal 364 is connected to receive the ADDR_LSB signal from the phase accumulator 322.

Thus, under the control of the ADDR_LSB signal, the output terminal 362 receives either the DPC signal or the zero signal. The output terminal 362 is identified as producing a Cy signal, representing an adder carry signal. When the ADDR_LSB signal is active, an odd sample is being addressed and thus the output terminal 362 receives the DPC signal. Alternatively, when the ADDR_LSB signal is inactive, the even sample is being addressed and thus the output terminal 362 receives the zero signal.

The adder 328 has an n-bit first input bus 366, an n−2-bit second input bus 368, a carry terminal 370, and an n-bit output bus 372. The first input bus 366 is connected to the phase accumulator 322 to receive the ADDR_MS signal. The second input bus 368 is connected to receive from the lookup table 324 the SPD signal. The carry terminal 370 is connected to the output terminal 362 of the multiplexer 326. Summing the signals received at the first and second input buses 366, 368 in view of the signal received at the carry terminal 370, the adder 328 produces at its output bus 372 a QUARTER_SINE signal representing a quarter sinewave.

The logic circuit 330 includes a 2-bit first input bus 374, an n-bit second input bus 376 and an n+1-bit output bus 378. The first input bus 374 is connected to receive from the phase accumulator 322 the QUADRANT signal. The second input bus 376 is connected to the adder 328 to receive the QUARTER_SINE signal. The logic circuit 330 is conventional and maps the samples received as the QUARTER_SINE signal into the appropriate quadrant of symmetry dictated by the QUADRANT signal to generate a full wave SINE signal at the output bus 378.

Thus it will be seen that the aspects of the invention provide for digitally representing a waveform defined by discrete ordered pairs of abscissae and ordinates, the ordered pairs being divided into an odd set and an even set. For each even abscissa, there is generated a difference code representing a difference between an even ordinate paired with the even abscissa and the even abscissa, whereby the even ordinate paired with the even abscissa is represented as the sum of the even abscissa and the corresponding difference code. For each odd abscissa, there is generated a differential code representing a differential between an odd ordinate paired with the odd abscissa and an even ordinate corresponding to the odd abscissa, whereby the odd ordinate paired with the odd abscissa is represented as the sum of the corresponding even ordinate and the corresponding differential code.

It will be appreciated that the invention may be embodied in manners other than the precise examples provided. For example, a microprocessor or digital signal processor might be programmed to implement a method according to the invention.

While specific embodiments of the invention have been described and illustrated, such embodiments should be considered illustrative of the invention only and not as limiting the invention as construed in accordance with the accompanying claims.

What is claimed is:

1. A method for digitally representing a waveform segment defined by discrete ordered pairs of abscissae and ordinates, the ordered pairs being grouped into an odd set and an even set, comprising:
   a) for each even abscissa, generating a difference code representing a difference between an even ordinate paired with the even abscissa and the even abscissa, whereby the even ordinate paired with the even abscissa is represented as the sum of the even abscissa and the corresponding difference code; and
   b) for each odd abscissa, generating a differential code representing a differential between an odd ordinate paired with the odd abscissa and an even ordinate corresponding to the odd abscissa, whereby the odd ordinate paired with the odd abscissa is represented as the sum of the corresponding even ordinate and the corresponding differential code.

2. A method as claimed in claim 1, wherein the even ordinate corresponding to the odd abscissa is paired with an even abscissa that is proximate to the odd abscissa.

3. A method as claimed in claim 2, wherein the even ordinate corresponding to the odd abscissa is paired with an even abscissa that is less then and adjacent to the odd abscissa.

4. A method as claimed in claim 3, wherein the even ordinate corresponding to the odd abscissa is paired with an even abscissa that ordinally immediately precedes the odd abscissa.

5. A method as claimed in claim 1, wherein generating a difference code includes:
   a) bit-shifting the even abscissa to generate a bit-shifted even abscissa; and
   b) generating a difference code representing a difference between an even ordinate paired with the even abscissa and the bit-shifted even abscissa.

6. A method as claimed in claim 1, further including:
a) storing the difference code in an even memory cell addressable by the even abscissa; and
b) storing the differentiate code in an odd memory cell addressable by the odd abscissa.

7. A method as claimed in claim 6, further including concatenating into a combined memory cell the odd memory cell addressable by the odd abscissa and the even memory cell addressable by the even abscissa, the odd abscissa corresponding to and the even abscissa being paired with the same even ordinate.

8. A method as claimed in claim 7, wherein the waveform segment is one period.

9. A method as claimed in claim 7, further including digitally representing a second waveform segment that is symmetrical to the waveform segment by symmetrically mapping discrete ordered pairs that define the waveform segment into the second waveform segment.

10. A method as claimed in claim 1, further including:
a) ordinally selecting each abscissa;
b) for each even selected abscissa, generating an ordinate as the sum of the selected abscissa plus the corresponding difference code; and
c) for each odd selected abscissa, generating an ordinate as the sum of the selected abscissa plus the corresponding ordinate plus the corresponding differential code.

11. An apparatus for digitally representing a waveform segment defined by discrete ordered pairs of abscissae and ordinates, the ordered pairs being grouped into an odd set and an even set, comprising:
a) an even signal generator for generating for each even abscissa a difference code representing a difference between an even ordinate paired with the even abscissa and the even abscissa, whereby the even ordinate paired with the even abscissa is represented as the sum of the even abscissa and the corresponding difference code; and
b) an odd signal generator for generating for each odd abscissa a differential code representing a differential between an odd ordinate paired with the odd abscissa and an even ordinate corresponding to the odd abscissa, whereby the odd ordinate paired with the odd abscissa is represented as the sum of the corresponding even ordinate and the corresponding differential code.

12. An apparatus as claimed in claim 11, wherein:
a) the even signal generator includes an even lookup table configured for storing each difference code in a respective even memory cell addressable by the respective even abscissa, whereby when the even lookup table is addressed by a signal representing an even abscissa, the even lookup table generates a signal representing the corresponding difference code; and
b) the odd signal generator includes an odd lookup table configured to store each differential code in a respective odd memory cell addressable by the respective odd abscissa, whereby when the odd lookup table is addressed by a signal representing an odd abscissa, the odd lookup table generates a signal representing the corresponding differential code.

13. An apparatus as claimed in claim 12, wherein the even lookup table and the odd lookup table are combined into a combined lookup table configured to concatenate into respective combined memory cells each odd memory cell addressable by an odd abscissa and each even memory cell addressable by an even abscissa, where the odd abscissa corresponds to and the even abscissa is paired with the same even ordinate.

14. An apparatus as claimed in claim 13, wherein the even lookup table is configured to store an even ordinate corresponding to each odd abscissa in a memory location addressable by an even abscissa that is proximate to the odd abscissa.

15. An apparatus as claimed in claim 14, wherein the even lookup table is configured to store an even ordinate corresponding to each odd abscissa in a memory location addressable by an even abscissa that is less then and adjacent to the odd abscissa.

16. An apparatus as claimed in claim 15, wherein the even lookup table is configured to store an even ordinate corresponding to each odd abscissa in a memory location addressable by an even abscissa that ordinally immediately precedes the odd abscissa.

17. An apparatus as claimed in claim 16,
a) wherein the even lookup table is configured to store a plurality of difference codes respectively corresponding to the difference between each even ordinate and a bit-shifted instance of the even abscissa paired with each even ordinate; and
b) further including an adder connected to receive the plurality of difference codes and the respective bit-shifted instances of the even abscissae to produce a signal representing the even ordinates paired with the even abscissae.

18. An apparatus as claimed in claim 17, further including a logic circuit for digitally representing a second waveform segment that is symmetrical to the waveform segment, the logic circuit being configured to symmetrically map discrete ordered pairs that define the waveform segment into the second waveform segment.

19. An apparatus as claimed in claim 18, further including a phase accumulator for ordinally selecting each abscissa to address the combined lookup table, whereby for each selected even abscissa, the combined lookup table generates an ordinate being the sum of the selected abscissa plus the corresponding difference code and whereby for each selected odd abscissa, the combined lookup table generates an ordinate being the sum of the selected abscissa plus the corresponding ordinate plus the corresponding differential code.

20. An apparatus for digitally representing a waveform segment defined by discrete ordered pairs of abscissae and ordinates, the ordered pairs being grouped into an odd set and an even set, comprising:
a) means for generating for each even abscissa a difference code representing a difference between an even ordinate paired with the even abscissa and the even abscissa, whereby the even ordinate paired with the even abscissa is represented as the sum of the even abscissa and the corresponding difference code; and
b) means for generating for each odd abscissa a differential code representing a differential between an odd ordinate paired with the odd abscissa and an even ordinate corresponding to the odd abscissa, whereby the odd ordinate paired with the odd abscissa is represented as the sum of the corresponding even ordinate and the corresponding differential code.

21. A storage medium for storing codes to digitally represent a waveform segment defined by discrete ordered pairs of abscissae and ordinates, the ordered pairs being grouped into an odd set and an even set, the codes comprising:
a) for each even abscissa, a difference code representing a difference between an even ordinate paired with the even abscissa and the even abscissa, whereby the even ordinate paired with the even abscissa is represented as the sum of the even abscissa and the corresponding difference code; and b) for each odd abscissa, a differential code representing a differential between an odd ordinate paired with the odd abscissa and an even ordinate corresponding to the odd abscissa, whereby the odd ordinate paired with the odd abscissa is represented as the sum of the corresponding even ordinate and the corresponding differential code.

22. A signal digitally representing a waveform segment defined by discrete ordered pairs of abscissae and ordinates, the ordered pairs being grouped into an odd set and an even set, the signal comprising:

a) a plurality of pairs of even ordinate paired with even abscissa, wherein each even ordinate paired with an even abscissa is represented as a sum of the even abscissa and a corresponding difference code, the corresponding difference code representing a difference between the even ordinate paired with the even abscissa and the even abscissa; and b) a plurality of pairs of odd ordinate paired with odd abscissa, wherein each odd ordinate paired with an odd abscissa is represented as a sum of an even ordinate corresponding to the odd abscissa and a corresponding differential code, the corresponding differential code representing a differential between the odd ordinate paired with the odd abscissa and the corresponding even ordinate.

* * * * *